US011108997B2

(12) United States Patent
Tuo et al.

(10) Patent No.: US 11,108,997 B2
(45) Date of Patent: Aug. 31, 2021

(54) METHOD AND SYSTEM FOR HANDLING IMAGE DATA

(71) Applicant: SZ DJI TECHNOLOGY CO., LTD., Shenzhen (CN)

(72) Inventors: Wei Tuo, Shenzhen (CN); Hui Sun, Shenzhen (CN); Zisheng Cao, Shenzhen (CN); Qiang Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/265,122

(22) Filed: Feb. 1, 2019

(65) Prior Publication Data

US 2019/0166334 A1 May 30, 2019

Related U.S. Application Data

(63) Continuation of application No. PCT/CN2016/093281, filed on Aug. 4, 2016.

(51) Int. Cl.
*H04N 7/18* (2006.01)
*B64C 39/02* (2006.01)
(Continued)

(52) U.S. Cl.
CPC ............. *H04N 7/185* (2013.01); *B64C 39/02* (2013.01); *B64C 39/024* (2013.01); *B64D 47/08* (2013.01);
(Continued)

(58) Field of Classification Search
CPC ............... H04N 7/185; H04N 5/23229; H04N 21/2187; H04N 21/234363; B64C 39/02; B64C 39/024; B64D 47/08
See application file for complete search history.

(56) References Cited

U.S. PATENT DOCUMENTS

2013/0050486 A1* 2/2013 Omer ................. H04N 21/2187
348/144
2014/0316616 A1* 10/2014 Kugelmass ........... G06T 11/206
701/8
(Continued)

FOREIGN PATENT DOCUMENTS

CN 103442202 A 12/2013
CN 105049918 A * 11/2015
(Continued)

OTHER PUBLICATIONS

The World Intellectual Property Organization (WIPO) The International Search Report and Written Opinion for PCT/CN2016/093281 dated May 2, 2017 7 pages.

*Primary Examiner* — Jamie J Atala
*Assistant Examiner* — Hesham K Abouzahra
(74) *Attorney, Agent, or Firm* — Anova Law Group, PLLC (57) ABSTRACT

A method for handling image data of an electronic device includes an imaging device of the electronic device acquiring a plurality of images and continuing to acquire additional images after acquiring the plurality of images, and, while the additional images are continuously acquired by the imaging device, one or more processors of the electronic device storing first image data that correspond to the acquired plurality of images to a storage device of the electronic device, processing the plurality of images to generate second image data, and transmitting the second image data to a remote device. The second image data has a smaller data size than the first image data.

15 Claims, 8 Drawing Sheets

(51) Int. Cl.
   *H04N 21/2187* (2011.01)
   *H04N 21/2343* (2011.01)
   *B64D 47/08* (2006.01)
   *H04N 5/232* (2006.01)
   *H04N 21/433* (2011.01)

(52) U.S. Cl.
   CPC ..... *H04N 5/23229* (2013.01); *H04N 21/2187* (2013.01); *H04N 21/234363* (2013.01); *B64C 2201/027* (2013.01); *B64C 2201/141* (2013.01); *H04N 21/433* (2013.01)

(56) References Cited

U.S. PATENT DOCUMENTS

| | | | |
|---|---|---|---|
| 2017/0147048 A1* | 5/2017 | Park | G06F 1/206 |
| 2018/0091217 A1* | 3/2018 | Christomanos | B64C 39/024 |
| 2018/0118337 A1* | 5/2018 | Viel | B08B 1/002 |
| 2019/0002127 A1* | 1/2019 | Straus | B64F 1/007 |

FOREIGN PATENT DOCUMENTS

| | | | | |
|---|---|---|---|---|
| CN | 105049918 A | | 11/2015 | |
| CN | 105472252 A | * | 4/2016 | ........... B64C 39/024 |
| CN | 105472252 A | | 4/2016 | |
| CN | 205179207 U | | 4/2016 | |
| EP | 2902744 A1 | | 8/2015 | |

\* cited by examiner

602
Acquire, by an imaging device of an electronic device, a plurality of images

604
After acquiring the plurality of images, continue to acquire additional images by the imaging device

606
While continuing to acquire the additional images by the imaging device: store, to the storage device, first image data that correspond to the acquired plurality of images; process the plurality of images to generate second image data, wherein the second image data has a smaller data size than the first image data; and transmit the second image data to a remote device.

608
The electronic device is an unmanned aerial vehicle (UAV), and the electronic device acquires the plurality of images, continues to acquire the additional images, stores the first image data, processes the plurality of images, and transmits the second image data, while the UAV is in flight.

610
Transmit the first image data to an image processing system for post-processing while the UAV is not in flight.

612
Transmitting the second image data to the remote device includes transmitting the second image data to the remote device through a wireless connection between the electronic device and the remote device

614
The first image data include raw image data of the plurality of images.

616
While continuing to acquire the additional images by the imaging device, apply lossless or near-lossless compression to the plurality of images to generate the first image data

618
Processing the plurality of images to generate the second image data reduces a resolution of the plurality of images

---

620
Processing the plurality of images to generate the second image data decreases a frame rate of the plurality of images.

---

622
The one or more processors includes an image signal processor (ISP), and the ISP processes the plurality of images to generate the second image data 624
The ISP is implemented in a field-programmable gate array (FPGA)

626
The ISP is implemented in an Application-Specific Integrated Circuit (ASIC)

---

628
The remote device is a control unit for controlling the electronic device

630
Receive one or more first instructions from the control unit for controlling movement of the electronic device 632
Receive one or more second instructions from the control unit for controlling image capture by the imaging device.

634
The second image data is streamed to the remote device and is displayed at the remote device in real-time

---
636
The plurality of images are video with a frame rate of at least 30 frames per second (FPS)

---
638
The plurality of images are video with a resolution of at least 4K

---
640
The imaging device is coupled to the storage device through an ISP

642
The ISP is connected to the storage device via a Peripheral Component Interconnect Express (PCIe) interface

644
The ISP is connected to the storage device via a Serial AT Attachment (SATA) interface

Figure 6C

METHOD AND SYSTEM FOR HANDLING IMAGE DATA

CROSS-REFERENCE TO RELATED APPLICATION

This application is a continuation of International Application No. PCT/CN2016/093281, filed on Aug. 4, 2016, the entire contents of which are incorporated herein by reference.

TECHNICAL FIELD

The disclosed embodiments relate generally to systems and methods for handling image data, and more particularly, but not exclusively, to handling image data during continuous image capturing.

BACKGROUND

Movable devices such as unmanned aerial vehicles (UAVs) frequently use imaging devices to capture image data as the device moves. The captured image data may be transmitted to a remote device, such as a remote control unit for controlling a UAV, so that a user can view the image data as it is captured. As the resolution of commonly used imaging formats increases, more bandwidth is required to transmit captured image data to a remote device.

SUMMARY

There is a need for systems and methods for devices that handle image data processing during continuous image capturing. The system and method disclosed herein store acquired image data and generate reduced size image data to transmit to a remote device, while image capturing is ongoing. Such systems and methods optionally complement or replace conventional methods for handling image data. In this way, image data with a desired quality (e.g., high resolution and high frame rate image data) can be captured and stored locally without regard to available bandwidth for communications between the device (e.g., a UAV), or other remote controlled field equipment) and a remote device (e.g., a control unit on the ground, or in a control facility). At the same time, a user at the remote device can utilize sub-sampled image data transmitted from the device to provide suitable control instructions for navigating the device and/or carrying various types of missions using onboard equipment of the device.

In accordance with some embodiments, a method for handling image data comprises, at an electronic device comprising an imaging device, a storage device, and one or more processors coupled to the imaging device and the storage device: acquiring, by the imaging device, a plurality of images; after acquiring the plurality of images, continuing to acquire additional images by the imaging device; and while continuing to acquire the additional images by the imaging device: storing, to the storage device, first image data that correspond to the acquired plurality of images; processing the plurality of images to generate second image data, wherein the second image data has a smaller data size than the first image data; and transmitting the second image data to a remote device.

In accordance with some embodiments, a system for handling image data comprises an imaging device; a storage device; and one or more processors coupled to the imaging device and the storage device. The one or more processors are configured for: acquiring, by the imaging device, a plurality of images; after acquiring the plurality of images, continuing to acquire additional images by the imaging device; and while continuing to acquire the additional images by the imaging device: storing, to the storage device, first image data that correspond to the acquired plurality of images; processing the plurality of images to generate second image data, wherein the second image data has a smaller data size than the first image data; and transmitting the second image data to a remote device.

In accordance with some embodiments, an unmanned aerial vehicle (UAV) comprises a propulsion system; an imaging device; a storage device; and one or more processors coupled to the propulsion system, the imaging device, and the storage device. The one or more processors are configured for: acquiring, by the imaging device, a plurality of images; after acquiring the plurality of images, continuing to acquire additional images by the imaging device; and while continuing to acquire the additional images by the imaging device: storing, to the storage device, first image data that correspond to the acquired plurality of images; processing the plurality of images to generate second image data, wherein the second image data has a smaller data size than the first image data; and transmitting the second image data to a remote device.

In accordance with some embodiments, a computer readable medium stores one or more programs. The one or more programs comprise instructions, which when executed by one or more processors of a device, cause the device to: acquire, by an imaging device, a plurality of images; after acquiring the plurality of images, continue to acquire additional images by the imaging device; and while continuing to acquire the additional images by the imaging device: store, to a storage device, first image data that correspond to the acquired plurality of images; process the plurality of images to generate second image data, wherein the second image data has a smaller data size than the first image data; and transmit the second image data to a remote device.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Techniques for handling image data are described herein. In some embodiments, the images are captured using a camera, such as a standalone camera or a camera that is a component of a mobile device (e.g., a handheld mobile device). In some embodiments, the images are captured using a camera that is a payload of a UAV or other remote controlled and/or autonomous vehicle. When image data is captured by a device (such as a UAV or other movable object) that is remote from a user operated device (such as a remote control device for a UAV), it is desirable for image data to be provided at a user operated device, so that the user is able to, e.g., view image data being captured, direct image capture properties, direct movement of the movable object based on the imaged subject, and/or indicate a subject to be imaged for targeting by the imaging device. Typically, it is desirable for the captured image data to be available for viewing at the user operated device in real time or substantially real time (e.g., with minimal delay) as the image data is captured.

In some cases, it is advantageous and/or necessary to limit the bandwidth consumed by transfer of captured image data to a remote device, e.g., such that a user can view the captured images on the remote device in substantially real time. It may be possible for an imaging device to capture image data having a size that is beyond the desired and/or available bandwidth for transmitting image data to the remote device. However, users may wish to store image data captured at the maximum quality available from the imaging device, or at another image data size that is in excess of the desired and/or available bandwidth for transmitting image data. By storing high quality image data (such as HD, 4K (e.g., 4Kp60), and/or higher quality video) locally to a device and generating a low quality version of the image data for transmitting to a remote device, a user is enabled to view captured image data in substantially real time while a high quality version of the image data is stored for later use. In some embodiments, generating low quality image data for transmission to a remote device allows high quality image data to be stored by a device that is small and lightweight. As used herein, "quality" refers to, e.g., resolution, dynamic range, and/or frame rate.

In some embodiments, the system and method for handling image data may also be used for handling other types of data where large data storage throughput is required, e.g., in commercial or scientific research settings, where large arrays of sensors (e.g., photo sensors, vibration sensors, etc.) capture raw sensor data needed for subsequent processing with a fast rate. In some embodiments, a low resolution version of the raw sensor data is made available on an output peripheral (such as a display) of the device that captures the raw sensor data and/or is transmitted to a remote device that is in communication with and, optionally, controls, the device.

Figure 1:
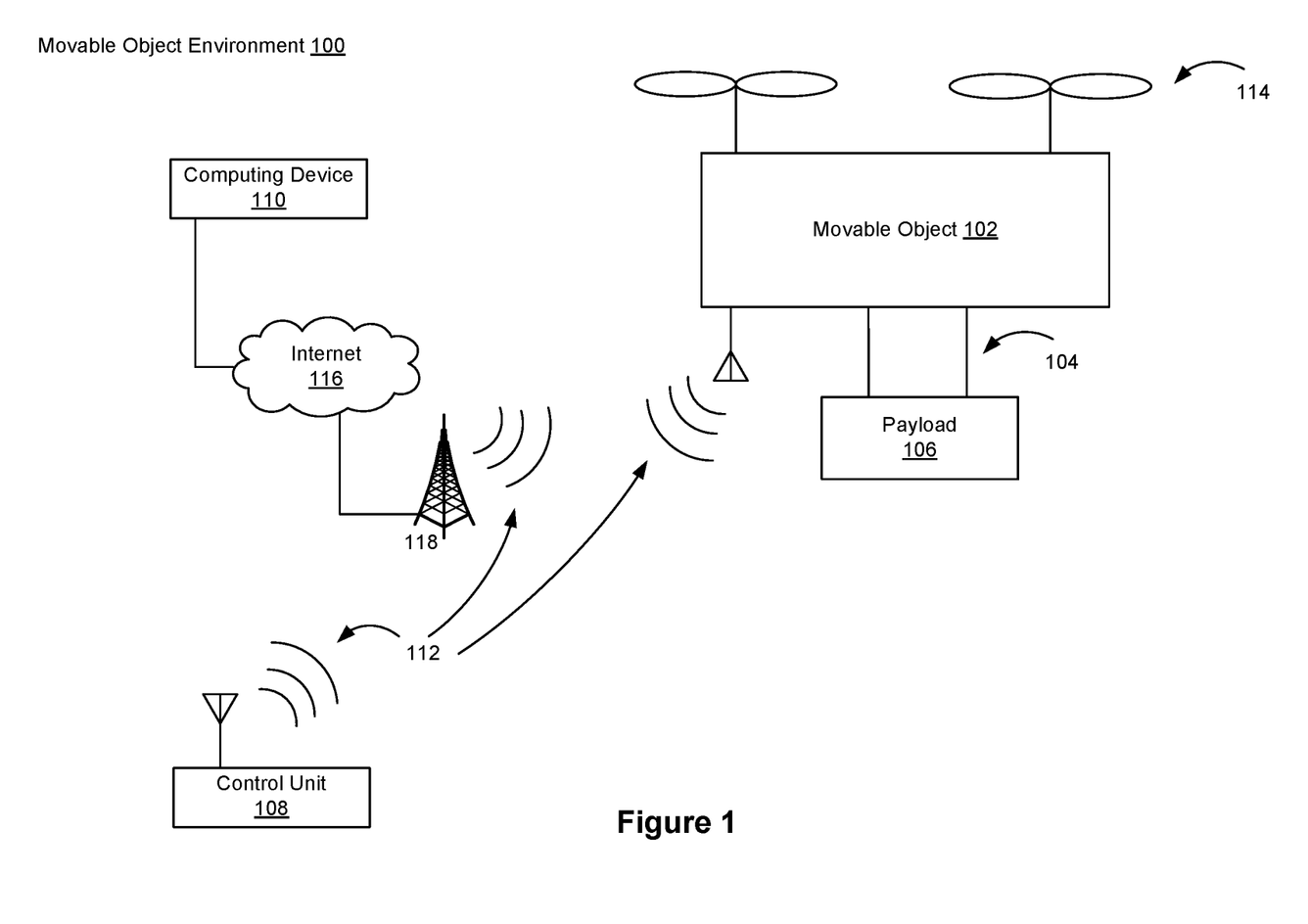
FIG. 1 is a schematic diagram of a movable object environment, in accordance with some embodiments.

FIG. 1 illustrates a movable object environment 100, in accordance with some embodiments. The movable object environment 100 includes a movable object 102. In some embodiments, the movable object 102 includes a carrier 104, a payload 106, and/or one or more movement mechanisms 114.

In some embodiments, the carrier 104 is used to couple a payload 106 to movable object 102. In some embodiments, the carrier 104 includes an element (e.g., a gimbal and/or damping element) to isolate the payload 106 from movement of the movable object 102 and/or the one or more movement mechanisms 114. In some embodiments, the carrier 104 includes an element for controlling movement of the payload 106 relative to the movable object 102.

In some embodiments, the payload 106 is coupled (e.g., rigidly coupled) to the movable object 102 (e.g., coupled via the carrier 104) such that the payload 106 remains substantially stationary relative to the movable object 102. For example, the carrier 104 is coupled to the payload 106 such that the payload is not movable relative to the movable object 102. In some embodiments, the payload 106 is mounted directly to the movable object 102 without requiring the carrier 104. In some embodiments, the payload 106 is located partially or fully within the movable object 102.

In some embodiments, the movable object environment 100 includes a control unit 108 that communicates with the movable object 102, e.g., to provide control instructions to the movable object 102 and/or to display information received from the movable object 102.

In some embodiments, the movable object environment 100 includes a computing device 110. The computing device 110 is, e.g., a server computer, desktop computer, a laptop computer, a tablet, or another portable electronic device (e.g., a mobile telephone). In some embodiments, the computing device 110 is a base station that communicates (e.g., wirelessly) with the movable object 102 and/or the control unit 108. In some embodiments, the computing device 110 provides data storage, data retrieval, and/or data processing operations, e.g., to reduce the processing power and/or data storage requirements of the movable object 102 and/or the control unit 108. For example, the computing device 110 is communicatively connected to a database and/or the computing device 110 includes a database. In some embodiments, the computing device 110 is used in lieu of or in addition to the control unit 108 to perform any of the operations described with regard to the control unit 108.

In some embodiments, the movable object 102 communicates with a control unit 108 and/or a computing device 110, e.g., via wireless communications 112. In some embodiments, the movable object 102 receives information from the control unit 108 and/or the computing device 110. For example, information received by the movable object 102 includes, e.g., control instructions for controlling parameters of the movable object 102. In some embodiments, the movable object 102 transmits information to the control unit 108 and/or the computing device 110. For example, information transmitted by the movable object 102 includes, e.g., images and/or video captured by the movable object 102.

In some embodiments, communications between the computing device 110, the control unit 108 and/or the movable object 102 are transmitted via a network (e.g., Internet 116) and/or a wireless signal transmitter (e.g., a long range wireless signal transmitter) such as a cellular tower 118. In some embodiments, a satellite (not shown) is a component of Internet 116 and/or is used in addition to or in lieu of the cellular tower 118.

In some embodiments, information communicated between the computing device 110, the control unit 108 and/or the movable object 102 include control instructions. Control instructions include, e.g., navigation instructions for controlling navigational parameters of the movable object 102 such as position, orientation, attitude, and/or one or more movement characteristics (e.g., velocity and/or acceleration for linear and/or angular movement) of the movable object 102, the carrier 104, and/or the payload 106. In some embodiments, control instructions include instructions for directing movement of one or more of the movement mechanisms 114. For example, control instructions are used to control flight of a UAV.

In some embodiments, control instructions include information for controlling operations (e.g., movement) of the carrier 104. For example, control instructions are used to control an actuation mechanism of the carrier 104 so as to cause angular and/or linear movement of the payload 106 relative to the movable object 102. In some embodiments, control instructions adjust movement of the movable object 102 with up to six degrees of freedom.

In some embodiments, control instructions are used to adjust one or more operational parameters for the payload 106. For example, control instructions include instructions for adjusting a focus parameter and/or an orientation of the payload 106 (e.g., to track a target). In some embodiments, control instructions include instructions for: adjusting imaging properties and/or image device functions, such as adjusting a metering mode (e.g., a number, arrangement, size, and/or location of light metering areas); adjusting one or more exposure parameters (e.g., an aperture setting, a shutter speed, and/or an exposure index); capturing an image; initiating/ceasing video capture; powering an imaging device 218 (FIG. 2) on or off; adjusting an imaging mode (e.g., capturing still images or capturing video); adjusting a distance between left and right components of a stereographic imaging system; and/or adjusting a position, orientation, and/or movement (e.g., pan rate and/or pan distance) of a carrier 104, a payload 106 and/or an imaging device 302.

In some embodiments, when control instructions are received by the movable object 102, the control instructions change parameters of and/or are stored by the memory 204 (FIG. 2) of movable object 102.

The above identified elements need not be implemented as separate software programs, procedures, or modules, and thus various subsets of these elements may be combined or otherwise re-arranged in various embodiments, and stored in the memory 204 and/or the processor(s) 202. In some embodiments, the controlling system includes a subset of the elements identified above. Furthermore, the memory 204 and/or the processors 202 may store additional elements not described above. In some embodiments, the elements stored in the memory 204, the processor(s) 202, and/or a non-transitory computer readable storage medium of memory 204 and/or processors(s) 202, provide instructions for implementing respective operations in the methods described below. In some embodiments, some or all of these elements may be implemented with specialized hardware circuits that subsume part or all of the element functionality. One or more of the above identified elements may be executed by one or more processor(s) 202 of the movable object 102. In some embodiments, one or more of the above identified elements are stored on one or more storage devices of a device remote from the movable object (such as memory of the control unit 108 and/or the computing device 110) and/or executed by one or more processors of a device remote from the movable object 102 (such as processor(s) of the control unit 108 and/or the computing device 110).

Figure 2:
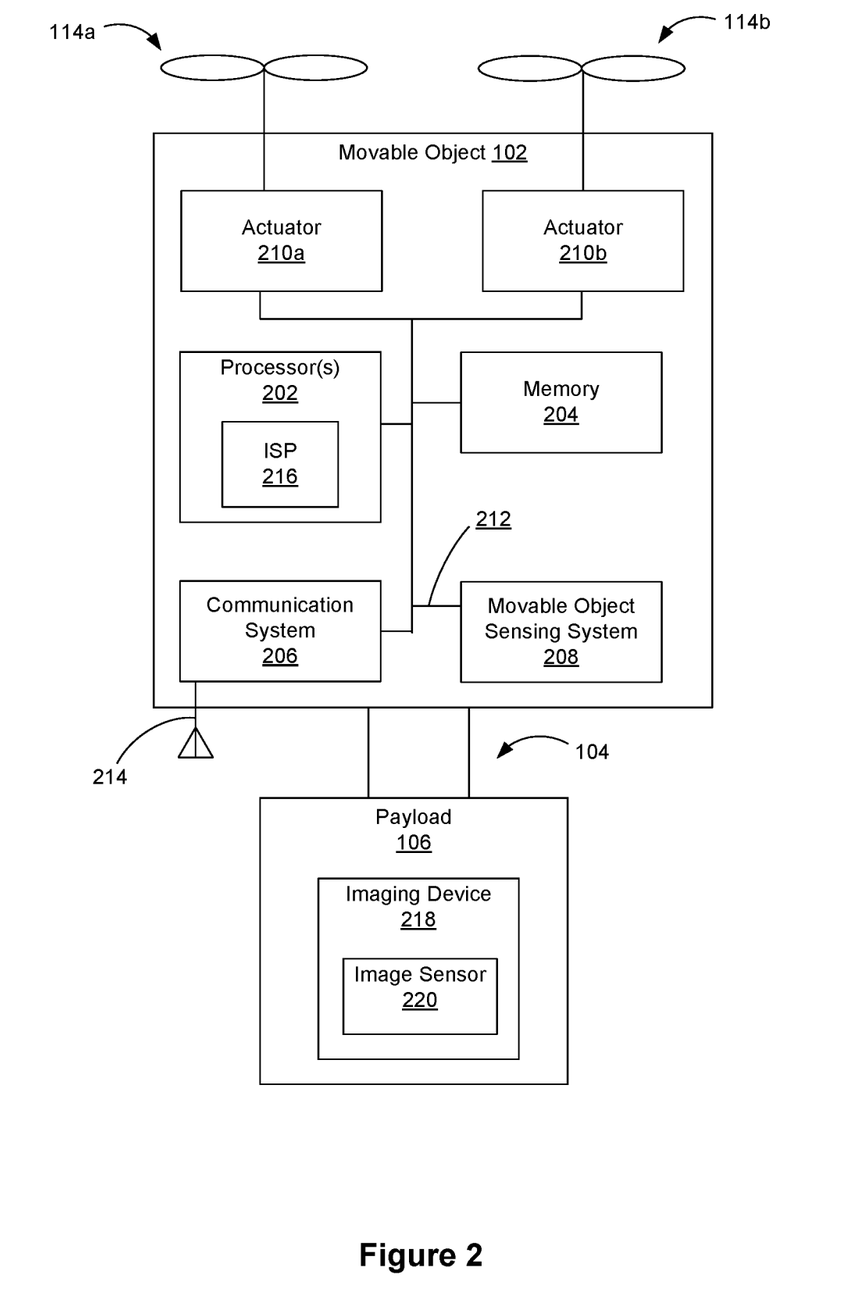
FIG. 2 is a system diagram of an exemplary movable object, in accordance with some embodiments.
Figure 3:
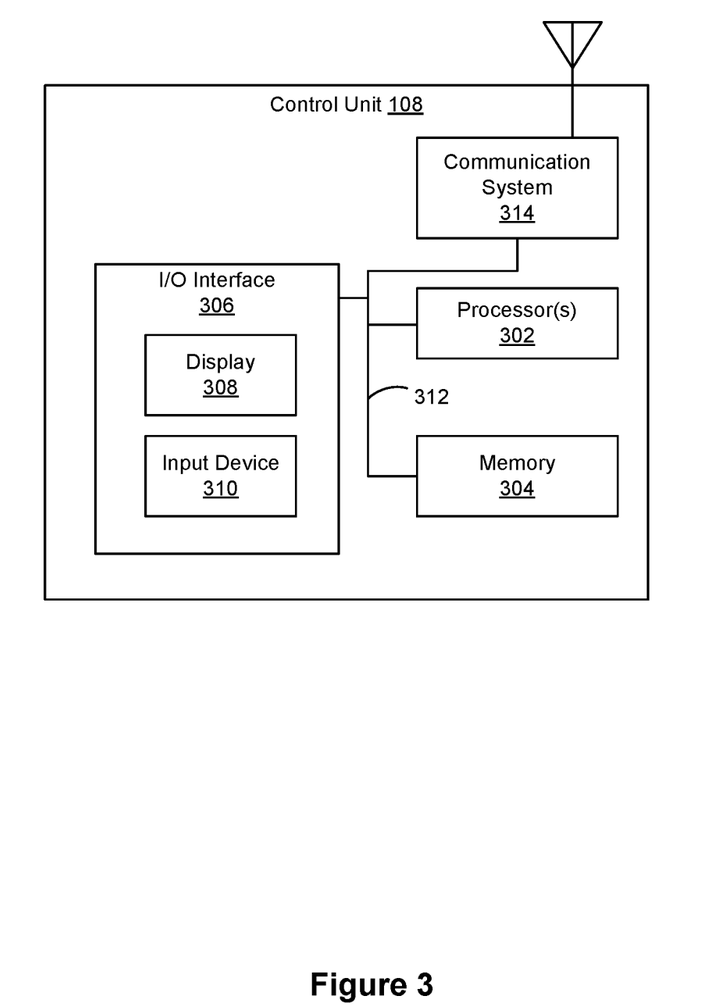
FIG. 3 is a system diagram of an exemplary control unit, in accordance with some embodiments.

FIG. 2 illustrates an exemplary movable object 102, in accordance with some embodiments. The movable object 102 typically includes one or more processor(s) 202, a memory 204, a communication system 206, a movable object sensing system 208, and one or more communication buses 212 for interconnecting these components.

In some embodiments, the one or more processor(s) include at least one Field Programmable Gate Array (FPGA) and/or at least one Application Specific Integrated Circuit (ASIC). In some embodiments, the one or more processor(s) 202 include one or more image signal processors (ISPs) 216 (e.g., implemented in the at least one FPGA and/or the at least one ASIC).

In some embodiments, memory 204 includes a solid state drive (SSD). In some embodiments, part or all of memory 204 is connected to a communication bus 212 via a Peripheral Component Interconnect Express (PCIe) interface or Serial AT Attachment (SATA) interface connects bus.

In some embodiments, the movable object 102 is a UAV and includes components to enable flight and/or flight control. In some embodiments, the movable object 102 includes communication system 206 with one or more network or other communications interfaces (e.g., via which flight control instructions are received), one or more movement mechanisms 114 (e.g., 114a, 114b), and/or one or more movable object actuators 210 (e.g., 210a, 210b). Movable object actuators (e.g., 210a, 210b) cause movement of movement mechanisms (e.g., 114a, 114b), e.g., in response to received control instructions. Although the movable object 102 is depicted as an aircraft, this depiction is not intended to be limiting, and any suitable type of movable object can be used.

In some embodiments, the movable object 102 includes movement mechanisms 114 (e.g., propulsion mechanisms). Although the plural term "movement mechanisms" is used herein for convenience of reference, "movement mechanisms 114" refers to a single movement mechanism (e.g., a single propeller) or multiple movement mechanisms (e.g., multiple rotors). The movement mechanisms 114 include one or more movement mechanism types such as rotors, propellers, blades, engines, motors, wheels, axles, magnets, nozzles, and so on. The movement mechanisms 114 are coupled to the movable object 102 at, e.g., the top, bottom, front, back, and/or sides. In some embodiments, the movement mechanisms 114 of a single movable object 102 include multiple movement mechanisms of the same type. In some embodiments, the movement mechanisms 114 of a single movable object 102 include multiple movement mechanisms with different movement mechanism types. The movement mechanisms 114 are coupled to the movable object 102 using any suitable means, such as support elements (e.g., drive shafts) and/or other actuating elements (e.g., the movable object actuators 210). For example, a movable object actuator 210 receives control signals from the processor(s) 202 (e.g., via the control bus 212) that activate the movable object actuator 210 to cause movement of a movement mechanism 114. For example, the processor(s) 202 include an electronic speed controller that provides control signals to a movable object actuator 210.

In some embodiments, the movement mechanisms 114 enable the movable object 102 to take off vertically from a surface or land vertically on a surface without requiring any horizontal movement of the movable object 102 (e.g., without traveling down a runway). In some embodiments, the movement mechanisms 114 are operable to permit the movable object 102 to hover in the air at a specified position and/or orientation. In some embodiments, one or more of the movement mechanisms 114 (e.g., 114a) are controllable independently of one or more of the other movement mechanisms 114 (e.g., 114b). For example, when the movable object 302 is a quadcopter, each rotor of the quadcopter is controllable independently of the other rotors of the quadcopter. In some embodiments, multiple movement mechanisms 114 are configured for simultaneous movement.

In some embodiments, the movement mechanisms 114 include multiple rotors that provide lift and/or thrust to the movable object 102. The multiple rotors are actuated to provide, e.g., vertical takeoff, vertical landing, and hovering capabilities to the movable object 102. In some embodiments, one or more of the rotors spin in a clockwise direction, while one or more of the rotors spin in a counterclockwise direction. For example, the number of clockwise rotors is equal to the number of counterclockwise rotors. In some embodiments, the rotation rate of each of the rotors is independently variable, e.g., for controlling the lift and/or thrust produced by each rotor, and thereby adjusting the spatial disposition, velocity, and/or acceleration of the movable object 102 (e.g., with respect to up to three degrees of translation and/or up to three degrees of rotation).

The communication system 206 enables communication with the control unit 108 and/or the computing device 110, e.g., via an antenna 214. The communication system 206 includes, e.g., transmitters, receivers, and/or transceivers for wireless communication. In some embodiments, the communication is one-way communication, such that data is only received by the movable object 102 from the control unit 108 and/or the computing device 110, or vice-versa. In some embodiments, communication is two-way communication, such that data is transmitted in both directions between the movable object 102 and the control unit 108 and/or the computing device 110. In some embodiments, the movable object 102, the control unit 108, and/or the computing device 110 are connected to the Internet 116 or other telecommunications network, e.g., such that data generated by the movable object 102, the control unit 108, and/or the computing device 110 is transmitted to a server for data storage and/or data retrieval (e.g., for display by a website).

In some embodiments, the sensing system 208 of the movable object 102 includes one or more sensors. In some embodiments, the one or more sensors of movable object sensing system 208 includes image sensor 220 (e.g., an imaging sensor of an imaging device 218, such as a digital camera). In some embodiments, one or more sensors of the movable object sensing system 208 are mounted to the exterior, located within, or otherwise coupled to the movable object 102. In some embodiments, one or more sensors of the movable object sensing system 208 are components of and/or coupled to the carrier 104 and/or the payload 106. For example, part or all of imaging device 218 is a payload 106, a component of payload 106, and/or a component of movable object 102. In some embodiments, one or more processor(s) 202, memory 204, and/or ISP(s) 216 are components of imaging device 218. The image sensor 220 is, e.g., a sensor that detects light, such as visible light, infrared light, and/or ultraviolet light. In some embodiments, the image sensor 220 includes, e.g., semiconductor charge-coupled devices (CCD), active pixel sensors using complementary metal-oxide-semiconductor (CMOS) and/or N-type metal-oxide-semiconductors (NMOS, Live MOS). In some embodiments, the image sensor 220 includes one or more arrays of photo sensors.

In some embodiments, the memory 204 stores one or more instructions, programs (e.g., sets of instructions), modules, controlling systems, controlling system configurations, and/or data structures, collectively referred to as "elements" herein. One or more elements described with regard to the memory 204 are optionally stored by the control unit 108, the computing device 110, the imaging device 218, and/or another device.

In some embodiments, the memory 204 stores a controlling system configuration that includes one or more system settings (e.g., as configured by a manufacturer, administrator, and/or user). For example, identifying information for the movable object 102 is stored as a system setting of the system configuration. In some embodiments, the controlling system configuration includes a configuration for the movable object sensing system 208. The configuration for the movable object sensing system 208 stores parameters such as position (e.g., of an optical device relative to the image sensor 220), zoom level and/or focus parameters (e.g., amount of focus, selecting autofocus or manual focus, and/or adjusting an autofocus target in an image). Imaging property parameters stored by memory 204 include, e.g., frame rate, image resolution, image size (e.g., image width and/or height), aspect ratio, pixel count, quality, focus distance, depth of field, exposure time, shutter speed, and/or white balance. In some embodiments, parameters stored by memory 204 are updated in response to control instructions (e.g., generated by processor(s) 202 and/or received by the movable object 102 from control unit 108 and/or the computing device 110).

In some embodiments, the controlling system includes instructions for initiating and/or ceasing storage of the image data output of the image sensor 220. In some embodiments, the controlling system includes image processing instructions for processing high quality image data to generate raw format image data and/or to generate reduced-size image data. In some embodiments, the image processing instructions include one or more compression algorithms, such as are well-known in the art.

FIG. 3 illustrates an exemplary control unit 108, in accordance with some embodiments. Although the control unit 108 is typically a portable (e.g., handheld) device, the control unit 108 need not be portable. In some embodiments, the control unit 108 is a dedicated control device (e.g., for the movable object 102), a laptop computer, a desktop computer, a tablet computer, a gaming system, a wearable device (e.g., glasses, a glove, and/or a helmet), a microphone, a portable communication device (e.g., a mobile telephone) and/or a combination thereof. The control unit 108 typically includes one or more processor(s) 302, a memory 304, an I/O interface 306, a communication system 314, and one or more communication buses 312 for interconnecting these components.

In some embodiments, I/O interface 306 includes an input device 310. In some embodiments, the input device 310 receives user input to control aspects of the movable object 102, the carrier 104, the payload 106, and/or a component thereof. Such aspects include, e.g., attitude, position, orientation, velocity, acceleration, navigation, and/or tracking. For example, a position of an input device of the control unit 108 (e.g., a position of a component of input device) is manually set by a user to a position corresponding to an input (e.g., a predetermined input) for controlling the movable object 102. In some embodiments, the input device is manipulated by a user to input control instructions for controlling the navigation of the movable object 102. In some embodiments, the input device 310 of the control unit 108 is used to input a flight mode for the movable object 102, such as auto pilot or navigation according to a predetermined navigation path.

In some embodiments, I/O interface 306 includes a display 308 of the control unit 108. In some embodiments, the display 308 displays information generated by the movable object sensing system 208 (e.g., imaging device 218 and/or image sensor 220), the memory 204, and/or another system of the movable object 102. For example, information displayed by a display 308 of the control unit 108 includes a processed version of image data captured by the imaging device 218 and/or image sensor 220. In some embodiments, information displayed by the display 308 is displayed in substantially real-time as information is received from the movable object 102 and/or as image data is acquired. In some embodiments, the display 308 displays tracking data (e.g., a graphical tracking indicator applied to a representation of a target), and/or indications of control data transmitted to the movable object 102. In some embodiments, the display 308 displays information about the movable object 102, the carrier 104, and/or the payload 106, such as position, attitude, orientation, movement characteristics of the movable object 102, and/or distance between the movable object 102 and another object (e.g., a target and/or an obstacle).

Figure 4:
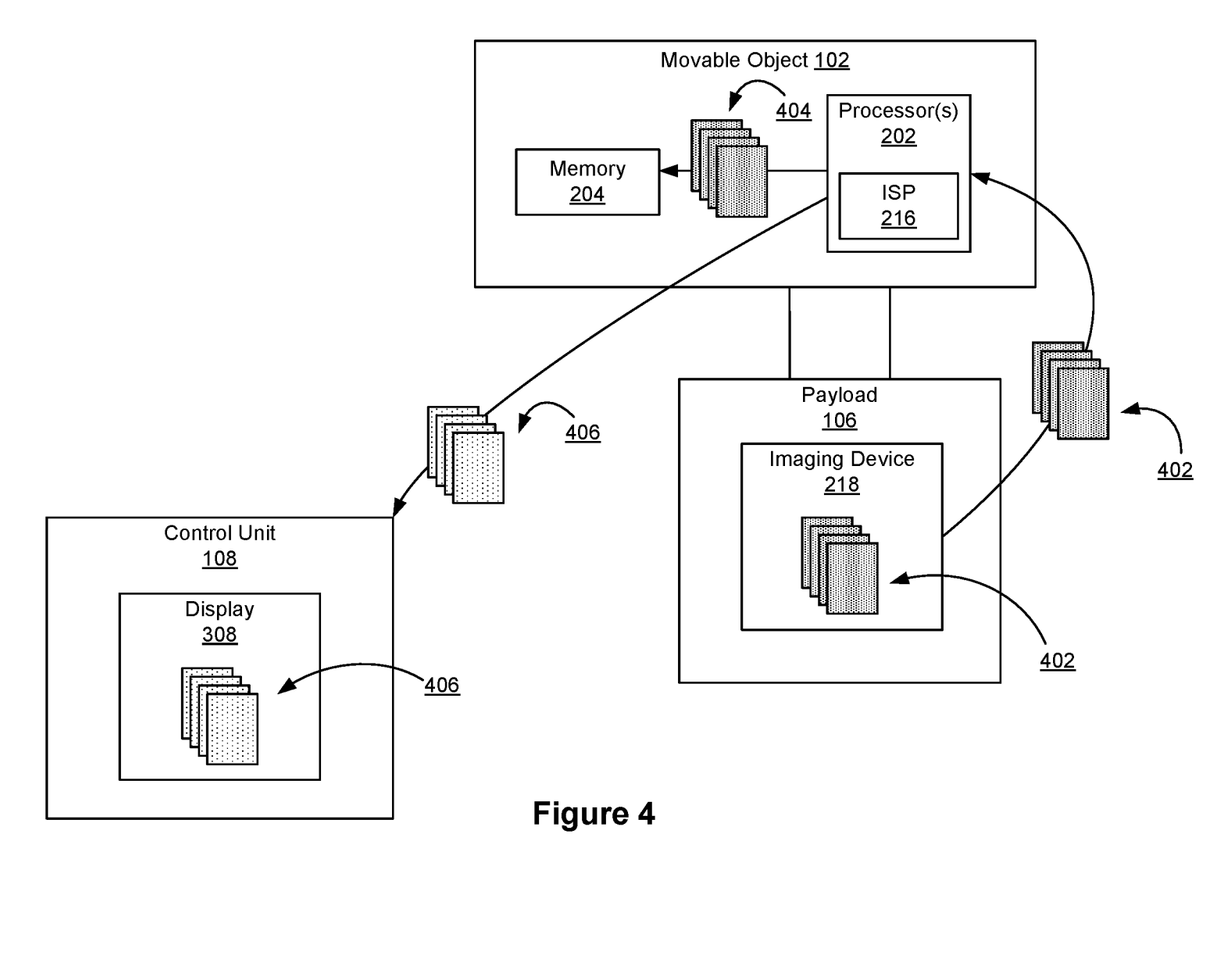
FIG. 4 is a schematic diagram that illustrates handling image data, in accordance with some embodiments.

FIG. 4 is a schematic diagram that illustrates handling image data, in accordance with some embodiments. The imaging device 218 continuously captures high quality image data 402 that includes a plurality of images (e.g., still images and/or video) at a high image resolution, such as 4K resolution (e.g., DCI 4K or UHD-1) or 8K image resolution (e.g., 8K UHD) and/or a high frame rate (e.g., 60 frames per second). Image data 404 that corresponds to the high quality image data 402 is stored to the memory 204 by the one or more processors 202. For example, the image data 404 stored to the memory 204 is a raw format version of the high quality image data 402 (e.g., raw image data received from the imaging device are directly stored in the memory 204 with minimal processing or change). In some embodiments, the one or more processors 202 (e.g., ISP 216) apply compression (e.g., lossless or near-lossless compression) to the high quality image data 402 to generate the image data 404 that is stored to the memory 204. In some embodiments, the image data 402 that is stored to the memory 204 is unprocessed image data 404 captured by the imaging device 218. In some embodiments, the memory 204 includes a solid state drive (SSD). In some embodiments, the SSD is coupled to the processors 202 locally through a PCIe compatible electrical interface.

The one or more processors 202 (e.g., including the ISP 216) downgrade the quality of the high quality image data 402 to generate downgraded image data 406. For example, lossy compression is applied to the high quality image data 402 to generate the downgraded image data 406. In some embodiments, the downgraded image data 406 has a smaller size, lower resolution, and/or lower frame rate in comparison with the high quality image data 402. In FIG. 4, the high quality image data 402 and the image data 404 that is stored to the memory 204 are shown with denser shading than the downgraded image data 406. In some embodiments, the ISP 216 is implemented in one or more FPGAs and/or ASICs.

As the imaging device 218 continuously captures additional high quality image data, and the processor 202 continuously stores the newly captured high quality image data to the memory 204 and generates downgraded image data from the newly captured high quality image data, the movable object 102 transmits the downgraded image data 406 that is already generated (e.g., via the communication system 206, FIG. 2) to the control unit 108. The control unit 108 displays the downgraded image data 406 at display 308. For example, the downgraded image data 406 is displayed in substantially real time (e.g., with a minimal delay, e.g., a delay of less than 200 milliseconds) as the high quality image data 402 is captured by the imaging device 218 and stored to the memory 204.

Figure 5:
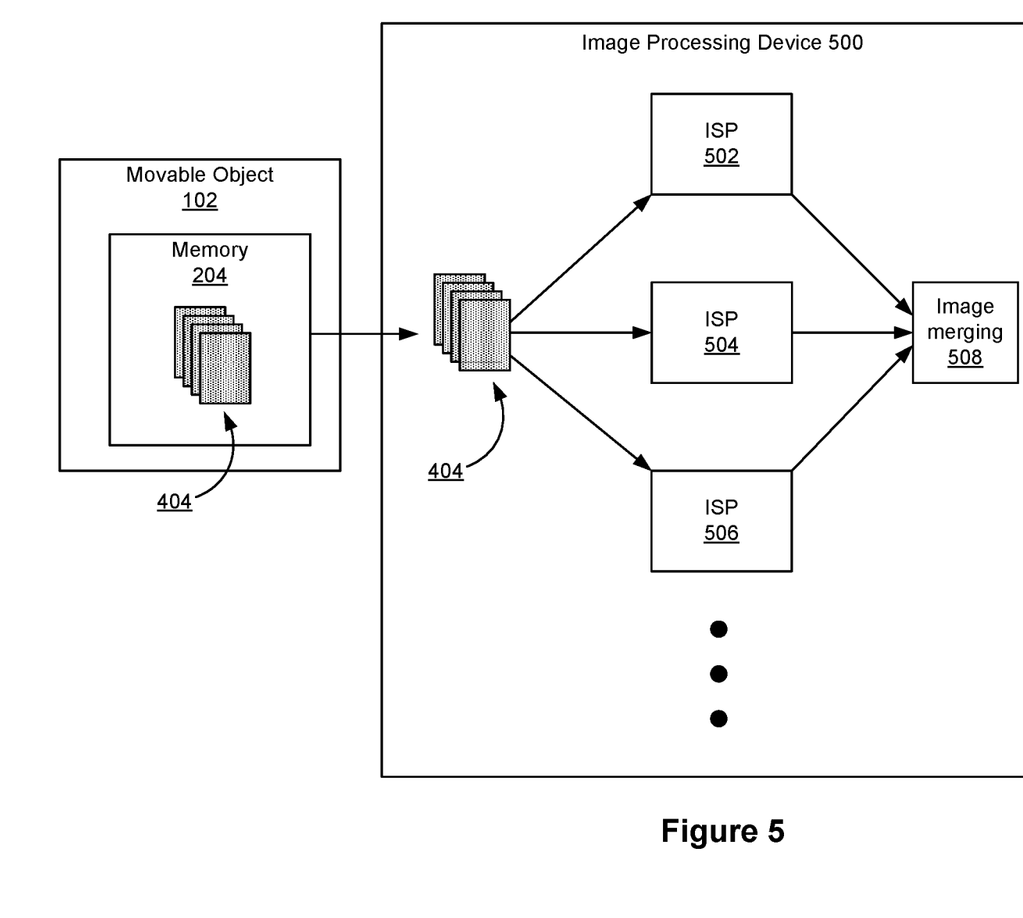
FIG. 5 is a schematic diagram that illustrates image processing, in accordance with some embodiments.

FIG. 5 is a schematic diagram that illustrates post-processing of the stored high quality image data 404 by an image processing device 500, in accordance with some embodiments. The image processing device 500 is, e.g., the control unit 108, the computing device 110, or another device that receives the stored high quality image data 404 from the movable object 102 (e.g., after the movable object 102 has landed). For example, the stored high quality image data 404 is transferred from the memory 204 of the movable object 102 to the image processing device 500, e.g., via a wired and/or wireless communication connection between the movable object 102 and the remote device 500. The stored high quality image data 404 is received by one or more ISPs 502, 504, 506 of image processing device 500. In some embodiments, the one or more ISPs 502, 504, 506, are implemented in one or more FPGAs and/or ASICs of the image processing device 500. The one or more ISPs 502, 504, 506 perform one or more processing operations on the received image data 404, such as defective pixel removal, image color correction, gamma correction, contrast adjustment, noise filtering, format adjustment, color domain adjustment, white balancing, and/or exposure adjustment.

In some embodiments, the processed image data output of the one or more ISPs 502, 504, 506 is received by the image merging module 508. The image merging module 508 is, e.g., implemented by a plurality of instructions stored by a memory device of image processing device 500 and executed by one or more processors of the image processing device 500. The image merging module 508 performs one or more merging operations, as are well-known in the art, on the processed image data output of the one or more ISPs 502, 504, 506 to generated merged image data. In some embodiments, the merged image data output of the image merging module 508 is saved to memory of the image processing device 500, transmitted to a remote device, and/or displayed by a display of the image processing device 500. In some embodiments, the image processing device 500 includes an interface usable for non-linear review and/or editing of the output of the one or more ISPs 504 and/or the image merging module 508.

Because parallel image processing is performed by the ISPs 502, 504, 506 of the image processing device 500, it is not necessary to perform parallel image processing using multiple ISPs on the movable object 102. In this manner, the size, weight, and/or power demands of the movable object 102 can be reduced, allowing for faster flight and greater maneuverability of the movable object 102.

Figure 6A:
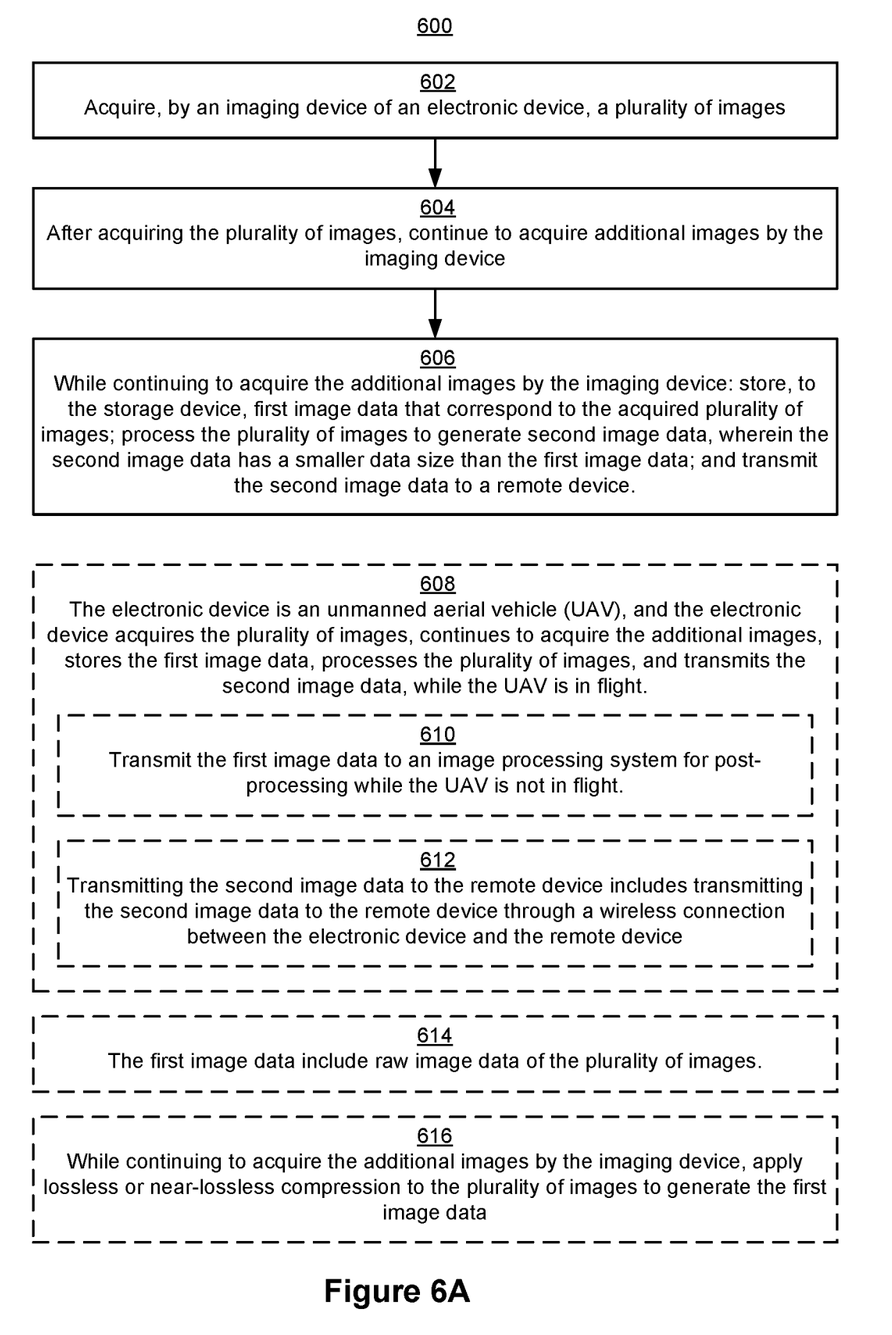
FIGS. 6A-6C are a flow diagram of a method for handling image data, in accordance with some embodiments.
Figure 6B:
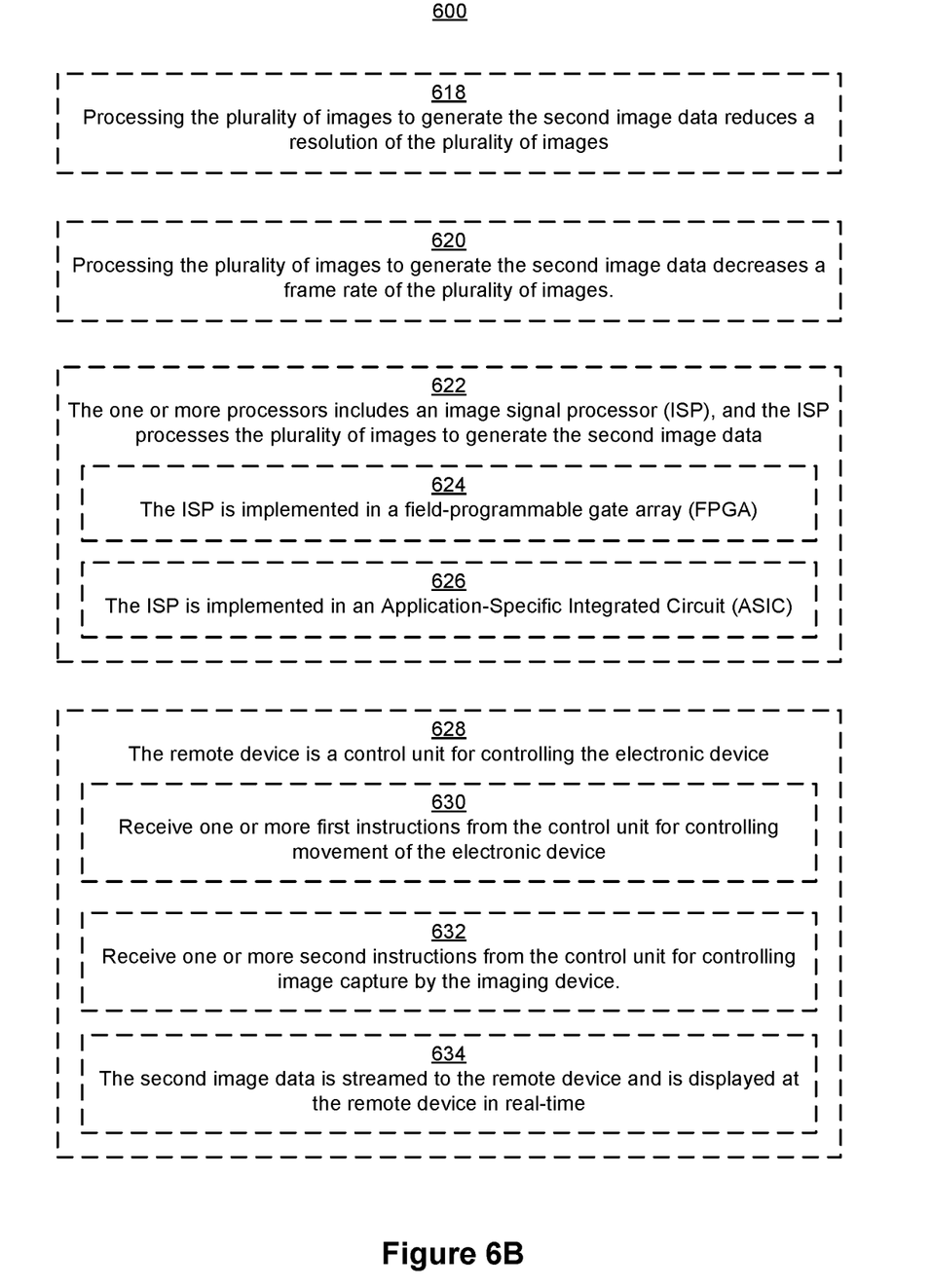
Figure 6C:
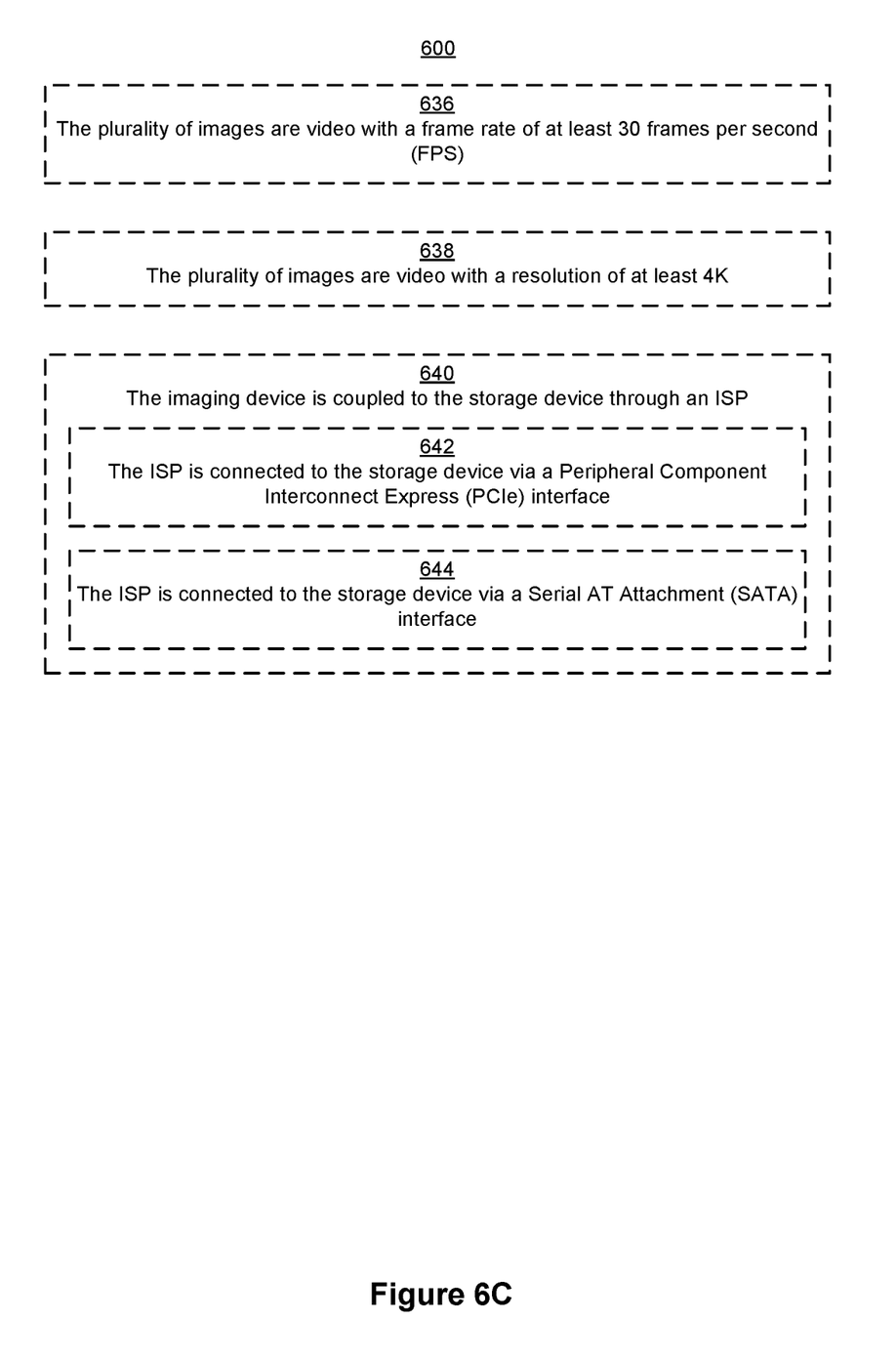

FIGS. 6A-6C are a flow diagram illustrating a method 600 for handling image data, in accordance with some embodiments. The method 600 is performed at a device, such as the movable object 102. The device includes an imaging device 218, a storage device (e.g., the memory 204), and one or more processors 202 coupled to the imaging device 218 and the storage device.

The device acquires (602), by the imaging device 218, a plurality of images (e.g., the high quality image data 402). For example, the plurality of images is a plurality of still images or a video.

After acquiring the plurality of images, the device continues (604) to acquire additional images (e.g., additional high quality image data 402) by the imaging device 218. In some embodiments, the acquisition of the plurality of images and the additional images is an ongoing, continuous, and uninterrupted process that occurs during navigation of the device.

While continuing to acquire the additional images (e.g., the additional high quality image data 402) by the imaging device 218, the device (606): stores, to the storage device (e.g., the memory 204 (e.g., an onboard SSD)), first image data (e.g., the image data 404) that correspond to the acquired plurality of images 404; processes (e.g., by one or more processor(s) 202) the plurality of images (e.g., the high quality image data 402) to generate second image data (e.g., the downgraded image data 406), wherein the second image data (e.g., the downgraded image data 406) has a smaller data size than the first image data (e.g., the image data 404); and transmits (e.g., via communication system 206) the second image data (e.g., the downgraded image data 406) to a remote device (e.g., the control unit 108 and/or computing device 110).

In some embodiments, the device is (608) an unmanned aerial vehicle (UAV), and the device acquires the plurality of images (e.g., the high quality image data 402), continues to acquire the additional images, stores the first image data, processes the plurality of images, and transmits the second image data (e.g., the downgraded image data 406), while the UAV is in flight.

In some embodiments, the device transmits (610) the first image data (e.g., the stored image data 404) to an image processing system (e.g., the image processing device 500) for post-processing while the UAV is not in flight (e.g., after the UAV has landed).

In some embodiments, transmitting the second image data (e.g., the downgraded image data 406) to the remote device (e.g., the control unit 108 and/or computing device 110) includes (612) transmitting the second image data to the remote device through a wireless connection between the electronic device and the remote device (e.g., via the communication system 206 and/or the communication system 314).

In some embodiments, the first image data (e.g., the stored image data 404) include (614) raw image data of the plurality of images (e.g., the high quality image data 402).

In some embodiments, while continuing to acquire the additional images by the imaging device (e.g., the imaging device 218), the device applies (616) lossless or near-lossless compression to the plurality of images (e.g., the high quality image data 402) to generate the first image data (e.g., the stored image data 404).

In some embodiments, processing the plurality of images (e.g., the high quality image data 402) to generate the second image data (e.g., the downgraded image data 406) reduces (618) the resolution of the plurality of images.

In some embodiments, processing the plurality of images (e.g., the high quality image data 402) to generate the second image data (e.g., the downgraded image data 406) decreases (620) the frame rate of the plurality of images.

In some embodiments, the one or more processors (e.g., the processors 202) include (622) an image signal processor (ISP) (e.g., the ISP 216), and the ISP processes the plurality of images (e.g., the high quality image data 402) to generate the second image data (e.g., the downgraded image data 406).

In some embodiments, the ISP (e.g., the ISP 216) is implemented (624) in a field-programmable gate array (FPGA).

In some embodiments, the ISP (e.g., the ISP 216) is implemented (626) in an Application-Specific Integrated Circuit (ASIC).

In some embodiments, the remote device (628) is a control unit (e.g., the control unit 108) for controlling the device.

In some embodiments, the device receives (630) one or more first instructions from the control unit (e.g., the control unit 108) for controlling movement of the device. For example, the device is a UAV and the device receives instructions from the control unit 108 for controlling one or more flight parameters of the UAV.

In some embodiments, the device receives (632) one or more second instructions from the control unit (e.g., the control unit 108) for controlling image capture by the imaging device (e.g., the imaging device 218). For example, the electronic device receives instructions from the control unit 108 for initiating and/or stopping high quality image storage (e.g., independent from continuing to generate the downgraded image data for transmitting to the control unit), and/or changes an orientation of the image sensor 220 relative to the device (e.g., by adjusting an orientation of the image sensor 220, the imaging device 218, the payload 106, and/or the carrier 104 relative to the device, such as the movable object 102).

In some embodiments, the second image data (e.g., the downgraded image data 406) is streamed (634) to the remote device (e.g., the control unit 108 and/or computing device 110) and is displayed (e.g., by the display 308) at the remote device (e.g., the control unit 108) in real-time.

In some embodiments, the plurality of images (e.g., the high quality image data 402) are video (636) with a frame rate of at least 30 frames per second (FPS).

In some embodiments, the plurality of images (e.g., the high quality image data 402) are video (638) with a resolution of at least 4K.

In some embodiments, the imaging device (e.g., the imaging device 218) is coupled (640) to the storage device (e.g., the memory 204) through an ISP (e.g., the ISP 216).

In some embodiments, the ISP (e.g., the ISP 216) is connected (642) to the storage device (e.g., the memory 204 (e.g., the SSD)) via a Peripheral Component Interconnect Express (PCIe) interface.

In some embodiments, the ISP (e.g., the ISP 216) is connected (644) to the storage device (e.g., the memory 204 (e.g., the SSD)) via a Serial AT Attachment (SATA) interface.

Many features of the technology disclosed herein can be performed in, using, or with the assistance of hardware, software, firmware, or combinations thereof. Consequently, features of the present technology may be implemented using a processing system. Exemplary processing systems (e.g., processor(s) 202, 302) include, without limitation, one or more general purpose microprocessors (for example, single or multi-core processors), application-specific integrated circuits, application-specific instruction-set processors, field-programmable gate arrays, graphics processors, physics processors, digital signal processors, coprocessors, network processors, audio processors, encryption processors, and the like.

Features of the present technology can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 204, 304) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystems (including molecular memory ICs), or any type of media or device suitable for storing instructions and/or data.

Stored on any one of the machine readable medium (media), features of the present technology can be incorporated in software and/or firmware for controlling the hardware of a processing system, and for enabling a processing system to interact with other mechanism utilizing the results of the present technology. Such software or firmware may include, but is not limited to, application code, device drivers, operating systems, and execution environments/containers.

Communication systems as referred to herein (e.g., the communication system 206, 314) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 302.11a, IEEE 302.11ac, IEEE 302.11ax, IEEE 302.11b, IEEE 302.11g and/or IEEE 302.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), spread spectrum technology such as FASST or DESST, or any other suitable communication protocol, including communication protocols not yet developed as of the filing date of this document.

While various embodiments of the present technology have been described above, it should be understood that they have been presented by way of example, and not limitation. It will be apparent to persons skilled in the relevant art that various changes in form and detail can be made therein without departing from the spirit and scope of the disclosure.

The present technology has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the present technology has been provided for the purposes of illustration and description. It is not intended to be exhaustive or to limit the disclosure to the precise forms disclosed. The breadth and scope of the present technology should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method for handling image data of an unmanned aerial vehicle (UAV), comprising:
   acquiring, by an imaging device configured on the UAV, a plurality of images while the UAV being in flight;
   after acquiring the plurality of images, continuing to acquire additional images by the imaging device;
   while the imaging device continuing to acquire the additional images and the UAV being in flight, applying, by a processor of the UAV, a first compression and a second compression to the plurality of images to generate first image data and second image data, respectively, wherein the second compression is associated with a dynamic range of the plurality of images, and the second image data has a smaller data size than the first image data;
   while the UAV being in flight, storing the first image data to a storage device configured on the UAV without transmitting the first image data to any devices remote from the UAV, and simultaneously transmitting, by the processor of the UAV, the second image data to a remote device through a direct connection between the UAV and the remote device for a real-time display at the remote device; and
   while the imaging device continuing to acquire the additional images, the UAV being in flight, and the processor storing the first image data and generating the second image data, receiving, by the processor from the remote device, control instructions for controlling an angular movement and a linear movement of the imaging device relative to the UAV;
wherein the first image data is configured for post-processing after the UAV has been landed.

2. The method of claim 1, wherein the first compression is a lossless or near-lossless compression.

3. The method of claim 1, wherein applying the second compression to the plurality of images to generate the second image data reduces a resolution of the plurality of images.

4. The method of claim 1, wherein applying the second compression to the plurality of images to generate the second image data decreases a frame rate of the plurality of images.

5. The method of claim 1, wherein the one or more processors include an image signal processor (ISP), and the ISP processes the plurality of images to generate the second image data.

6. The method of claim 5, wherein the ISP is implemented in a field-programmable gate array (FPGA) or in an Application-Specific Integrated Circuit (ASIC).

7. The method of claim 1, wherein the second image data is streamed to the remote device and is displayed at the remote device in real-time.

8. The method of claim 1, wherein the imaging device is coupled to the storage device through an image signal processor (ISP).

9. The method of claim 8, wherein the ISP is connected to the storage device via a Peripheral Component Interconnect Express (PCIe) interface or via a Serial AT Attachment (SATA) interface.

10. The method of claim 1, further comprising:
transmitting the first image data to an external device coupled to the storage device after the UAV has been landed, wherein the external device includes a plurality of image signal processors (ISPs) configured to perform a plurality of processing operations on the first image data.

11. A system for handling image data of an unmanned aerial vehicle (UAV), comprising:
an imaging device configured on the UAV;
a storage device configured on the UAV; and
one or more processors coupled to the imaging device and the storage device, the one or more processors being configured to:
acquire, through the imaging device, a plurality of images while the UAV being in flight;
after acquiring the plurality of images, continue to acquire additional images through the imaging device;
while the imaging device continuing to acquire the additional images and the UAV being in flight, apply a first compression and a second compression to the plurality of images to generate first image data and second image data, respectively, wherein the second compression is associated with a dynamic range of the plurality of images, and the second image data has a smaller data size than the first image data;
while the UAV being in flight, store the first image data to the storage device without transmitting the first image data to any devices remote from the UAV, and simultaneously transmit the second image data to a remote device through a direct connection between the UAV and the remote device for a real-time display at the remote device; and
while the imaging device continuing to acquire the additional images, the UAV being in flight, and the processor storing the first image data and generating the second image data, receiving, by the processor from the remote device, control instructions for controlling an angular movement and a linear movement of the imaging device relative to the UAV;
wherein the first image data is configured for post-processing after the UAV has been landed.

12. The system of claim 11, wherein the first compression includes a lossless or near-lossless compression that is applied to the plurality of images to generate the first image data.

13. The system of claim 11, wherein the second compression applied to the plurality of images reduces a resolution of the plurality of images to generate the second image data.

14. The system of claim 11, wherein the second compression applied to the plurality of images decreases a frame rate of the plurality of images to generate the second image data.

15. An unmanned aerial vehicle (UAV), comprising:
a propulsion system;
an imaging device;
a storage device; and
one or more processors coupled to the propulsion system, the imaging device, and the storage device, the one or more processors being configured to perform:
acquiring, by the imaging device, a plurality of images;
after acquiring the plurality of images, continuing to acquire additional images by the imaging device;
while the imaging device continuing to acquire the additional images and the UAV being in flight, applying a first compression and a second compression to the plurality of images to generate first image data and second image data, respectively, wherein the second compression is associated with a dynamic range of the plurality of images, and the second image data has a smaller data size than the first image data;
while the UAV being in flight, storing the first image data to the storage device configured on the UAV without transmitting the first image data to any devices remote from the UAV, and simultaneously transmitting the second image data to a remote device through a direct connection between the UAV and the remote device for a real-time display at the remote device; and
while the imaging device continuing to acquire the additional images, the UAV being in flight, and the processor storing the first image data and generating the second image data, receiving, by the processor from the remote device, control instructions for controlling an angular movement and a linear movement of the imaging device relative to the UAV;
wherein the first image data is configured for post-processing after the UAV has been landed.

* * * * *